(12) United States Patent
Oki et al.

(10) Patent No.: US 7,691,192 B2
(45) Date of Patent: *Apr. 6, 2010

(54) INK COMPOSITION, AND INK JET RECORDING METHOD AND RECORDED MATTER USING THE SAME

(75) Inventors: Yasuhiro Oki, Nagano (JP); Kazuhiko Kitamura, Nagano (JP); Hiroko Hayashi, Nagano (JP); Keiichi Tateishi, Kanagawa (JP); Shigeaki Tanaka, Kanagawa (JP); Yoshiharu Yabuki, Kanagawa (JP)

(73) Assignees: Seiko Epson Corporation, Tokyo (JP); Fuji Film Corporation, Kanagawa (JP)

( * ) Notice: Subject to any disclaimer, the term of this patent is extended or adjusted under 35 U.S.C. 154(b) by 479 days.

This patent is subject to a terminal disclaimer.

(21) Appl. No.: 10/573,797
(22) PCT Filed: Sep. 30, 2004
(86) PCT No.: PCT/JP2004/014350
  § 371 (c)(1),
  (2), (4) Date: May 22, 2007
(87) PCT Pub. No.: WO2005/030886
  PCT Pub. Date: Apr. 7, 2005

(65) Prior Publication Data
  US 2008/0022895 A1    Jan. 31, 2008

(30) Foreign Application Priority Data
  Sep. 30, 2003 (JP) ............................. 2003-339689

(51) Int. Cl.
  C09D 11/02 (2006.01)
  B41J 2/01 (2006.01)
(52) U.S. Cl. .................................. 106/31.49; 347/100
(58) Field of Classification Search .............. 106/31.49; 347/100
  See application file for complete search history.

(56) References Cited

U.S. PATENT DOCUMENTS 4,163,675 A * 8/1979 Hirano et al. ............ 106/31.43

(Continued)

FOREIGN PATENT DOCUMENTS

CN        1205755       1/1999

(Continued)

OTHER PUBLICATIONS

Patent Abstracts of Japan and JPO computer English translation of JP 2000-303009 dated Oct. 31, 2000.

Primary Examiner—Helene Klemanski
(74) Attorney, Agent, or Firm—Ladas and Parry LLP

(57) ABSTRACT

An ink composition including at least water, a cyan dye represented by the formula shown below and an aromatic compound having a carboxyl group and/or a salt thereof; an inkjet recording method using the composition; and recorded matter which is recorded by the recording method

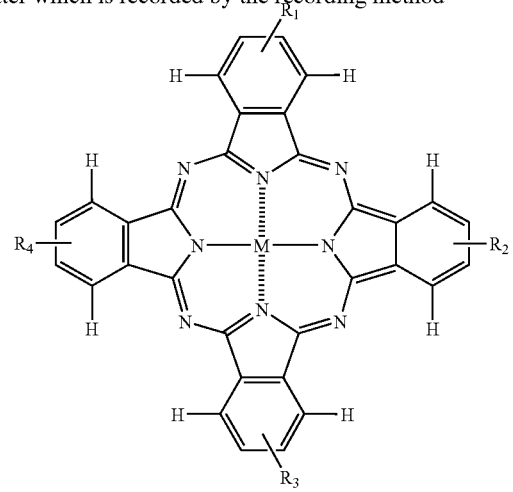

wherein M represents a hydrogen atom, a metal element, a metal oxide, a metal hydroxide or a metal halide, $R_1$ to $R_4$ each independently represents $-SO_2Z$, and Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, provided that at least one of four Z's has an ionic hydrophilic group as a substituent.

23 Claims, 1 Drawing Sheet

U.S. PATENT DOCUMENTS

| | | | |
|---|---|---|---|
| 6,319,309 B1 * | 11/2001 | Lavery et al. | 106/31.43 |
| 6,379,441 B1 * | 4/2002 | Kanaya et al. | 106/31.49 |
| 7,083,669 B2 * | 8/2006 | Fukumoto et al. | 106/31.49 |
| 7,211,132 B2 * | 5/2007 | Oki et al. | 106/31.49 |
| 7,276,111 B2 * | 10/2007 | Oki et al. | 106/31.49 |
| 7,279,034 B2 * | 10/2007 | Oki et al. | 106/31.49 |
| 7,303,616 B2 * | 12/2007 | Oki et al. | 106/31.49 |
| 2005/0183630 A1 * | 8/2005 | Oki et al. | 106/31.49 |
| 2006/0135646 A1 * | 6/2006 | Oki et al. | 523/160 |
| 2006/0203059 A1 * | 9/2006 | Oki et al. | 347/100 |
| 2008/0047461 A1 * | 2/2008 | Hanmura et al. | 106/31.47 |
| 2008/0145562 A1 * | 6/2008 | Kitamura et al. | 106/31.48 |

FOREIGN PATENT DOCUMENTS

| | | |
|---|---|---|
| JP | 6-25575 | 2/1994 |
| JP | 7-228810 | 8/1995 |
| JP | 2000-303009 | 10/2000 |
| JP | 2003-238865 | 8/2003 |
| JP | 2003-268274 | 9/2003 |
| JP | 2004-91631 | 3/2004 |
| JP | 2004-263155 | 9/2004 |
| WO | 97/23685 | 7/1997 |

* cited by examiner

INK COMPOSITION, AND INK JET RECORDING METHOD AND RECORDED MATTER USING THE SAME

TECHNICAL FIELD

The present invention relates to an ink composition suitable for inkjet recording, particularly, an ink composition excellent in the anti-bronzing property, and also relates to an inkjet recording method using the ink composition and recorded matter which is recorded by the recording method.

BACKGROUND ART

Inkjet recording is a method of recording a letter or an image (hereinafter sometimes simply referred to as an "image") on the surface of a recording medium by ejecting an ink composition in the form of small liquid droplets from fine nozzles. Examples of the inkjet recording system used in practice include a method of converting an electrical signal into a mechanical signal by the use of an electrostrictive element and intermittently ejecting an ink composition stored in the nozzle head part, thereby recording a letter or an image on the surface of a recording medium, and a method of rapidly heating an ink composition stored in the nozzle head part at the portion very close to the ejection part to generate a bubble and intermittently ejecting the ink composition due to volume expansion caused by the bubble, thereby recording a letter or an image on the surface of a recording medium.

From the aspect of safety and printing property, the ink composition for inkjet recording is generally produced by dissolving various types of dyes in water, an organic solvent or a mixed solution thereof and as for various properties of the ink composition, strict conditions are required as compared with the ink composition for a writing tool such as fountain pen and ballpoint pen.

In particular, an inkjet printer is recently starting to be employed in the preparation of printed matter for advertisement and at the time of forming a color image by using a plurality of ink compositions, severer requirements are made.

This is because in a color image formed by using a plurality of ink compositions, if there is even one color having poor color hue, the color hue impairs the color balance of the image as a whole and a high-quality image can be hardly obtained.

Particularly, in the case of an ink composition using a metal phthalocyanine-based dye as the coloring material, a phenomenon that the portion of high-duty printing such as solid printing (fill printing of 100% duty) looks reddish (hereinafter referred to as a "bronzing phenomenon") sometimes occurs. This gives rise to non-uniform color balance as the entire image and reduction in the image quality, and improvements are demanded.

Furthermore, many gloss paper sheets are recently employed as the recording medium having a texture close to the photographic touch, but due to a bronzing phenomenon caused by a specific color, the gloss feeling on the printed matter surface fluctuates to seriously impair the texture of image. Therefore, also from the standpoint of maintaining the gloss feeling of the entire image, improvements are keenly demanded.

The printed matter prepared by using the above-described ink composition is disposed not only indoors of course but also outdoors sometimes and exposed to various lights (including sunlight) and outside airs (e.g., ozone, nitrogen oxide, sulfur oxide), and attempts are being made to develop an ink composition excellent in the fastness to light and gas, but bronzing phenomenon is outstanding particularly in the case of using a cyan ink composition improved in the gas fastness. In this respect, improvements are demanded.

In the case where a dye having poor solubility in water is used in the ink composition for inkjet recording, a so-called bronzing phenomenon is known to occur when printing is performed on a recording medium having strong acidity.

In order to solve this problem, addition of alcohol amines as a pH maintaining agent or elevation of penetrating force into paper is generally employed. The bronzing phenomenon is considered to fundamentally occur due to crystallization of a dye resulting from drying of the ink-composition-on the paper surface, and the above-described methods are effective from the standpoint of elevating the solubility to prevent the crystallization or attaining penetration into paper before the crystallization proceeds. However, in the former, the pH readily elevates to the vicinity of 11 by the addition of alcohol amines and this may cause corrosion of nozzles of the printer or may adversely affect the human body. In the latter, if the penetrability is excessively intensified, a so-called bleeding phenomenon and other adverse effects on the printing quality may be brought about. Therefore, these methods are not almighty measures.

As an alternative to these ink compositions, an ink composition where 2-oxo-oxazolidone or 1,3-bis($\beta$-hydroxy-ethyl) urea is added for solving those problems has been proposed (see, for example, patent document 1).

Also, an ink composition where a basic amino acid is added with an attempt to solve those problems has been proposed (see, for example, patent document 2).

However, it is regrettably found from the results of various investigations and studies by the present inventors that even if these techniques are employed, in the case of an ink composition using a cyan dye excellent in the fastness (light fastness, gas fastness) of printed matter, which is intended to attain in the present invention, there is obtained no effect on the elimination or reduction of a bronzing phenomenon.

Patent Document 1: JP 6-25575 A
Patent Document 2: JP 7-228810 A

DISCLOSURE OF THE INVENTION

Problems to be Solved by the Invention

The present invention has been made under these circumstances, and an object of the present invention is to provide an ink composition capable of giving printed matter excellent in the fastness (mainly, gas fastness and light fastness). Another object of the present invention is to provide an ink composition further improved in aspects of the bronzing phenomenon. A still other object of the present invention is to provide an ink composition further improved in aspects of the clogging resistance. A yet still other object of the present invention is to provide an inkjet recording method using the ink composition and recorded matter which is recorded by the recording method.

Means to Solve the Problems

The present inventors have continuously made studies and investigations on the light fastness, gas fastness, prevention of bronzing phenomenon and the like of various known cyan dyes, as a result, it has been found that when an aromatic compound having a carboxyl group and/or a salt thereof is added to an ink composition containing a cyan dye, the improvement effect is higher for a specific cyan dye and further that when the salt of the compound having a carboxyl group added is a lithium salt, remarkably excellent improvement is obtained not only in the bronzing phenomenon but also in the clogging resistance. The present invention has been accomplished based on these findings.

That is, the above-described objects have been attained by the following inventions.

(1) An ink composition comprising at least water, a cyan dye represented by formula (I) shown below, and an aromatic compound having a carboxyl group and/or a salt thereof:

Formula (I):

[Chem. 3]

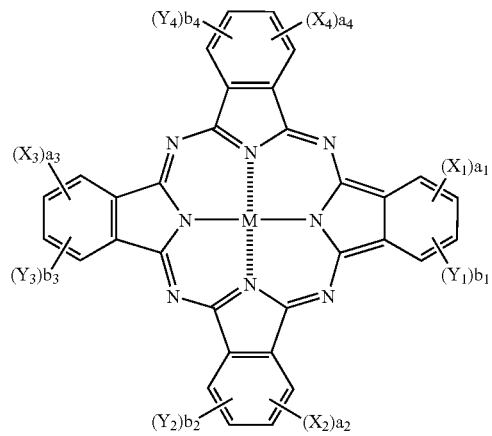

(wherein $X_1$, $X_2$, $X_3$ and $X_4$ each independently represents either —SO—Z or —SO$_2$—Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, and each group may further have a substituent;

$a_1$ to $a_4$ and $b_1$ to $b_4$ each represents the number of substituents $X_1$ to $X_4$ and $Y_1$ to $Y_4$, $a_1$ to $a_4$ each independently represents an integer of 0 to 4, provided that $a_1$ to $a_4$ all are not 0 at the same time, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent).

(2) The ink composition as described in (1), wherein the cyan dye represented by formula (I) is represented by the following formula (II):

Formula (II):

[Chem. 4]

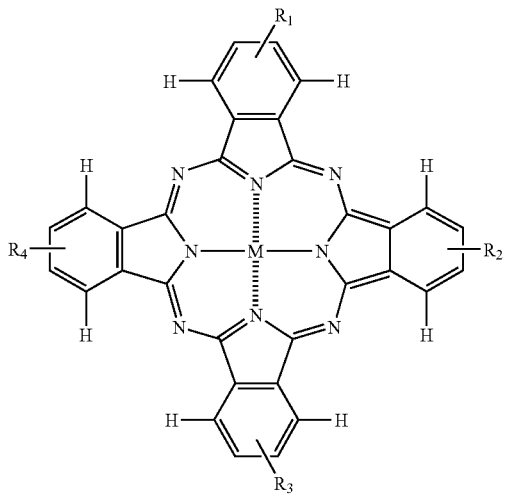

(wherein M has the same meaning as in formula (I), $R_1$ to $R_4$ each independently represents —SO$_2$Z, and Z has the same meaning as in formula (I), provided that at least one of four Z's has an ionic hydrophilic group as a substituent).

(3) The ink composition as described in (2), wherein the cyan dye is a cyan dye of formula (II) where M is a copper element and Z having an ionic hydrophilic group is a sulfoalkyl group.

(4) The ink composition as described in (3), wherein the counter cation of the sulfoalkyl group is a lithium cation.

(5) The ink composition as described in any one of (1) to (4), wherein the aromatic compound having a carboxyl group and/or a salt thereof is an aromatic compound having one carboxyl group and/or a salt thereof.

(6) The ink composition as described in any one of (1) to (5), wherein the aromatic compound having a carboxyl group and/or a salt thereof is a compound having a naphthalene skeleton and/or a salt thereof.

(7) The ink composition as described in (6), wherein the compound having a naphthalene skeleton and/or a salt thereof is a compound having a carboxyl group and an —OR group (wherein R is a hydrogen atom or an alkyl group having a carbon number of 1 to 6) on the naphthalene skeleton.

(8) The ink composition as described in (7), wherein the compound having a naphthalene skeleton and/or a salt thereof is a compound having one carboxyl group and one —OR group (wherein R is a hydrogen atom or an alkyl group having a carbon number of 1 to 6) on the naphthalene skeleton.

(9) The ink composition as described in any one of (6) to (8), wherein the compound having a naphthalene skeleton and/or a salt thereof is a compound having a carboxyl group at its 2-position and/or a salt thereof.

(10) The ink composition as described in (9), wherein the compound having a carboxyl group at its 2-position and having a naphthalene skeleton and/or a salt thereof is at least one member selected from a 1-hydroxy-2-naphthoic acid, a 2-naphthoic acid, a 3-hydroxy-2-naphthoic acid, a 6-hydroxy-2-naphthoic acid, a 3-methoxy-2-naphthoic acid, a 6-methoxy-2-naphthoic acid, a 6-ethoxy-2-naphthoic acid, a 6-propoxy-2-naphthoic acid, and a salt thereof.

(11) The ink composition as described in any one of (1) to (10), wherein the salt is a lithium salt.

(12) The ink composition as described in any one of (1) to (11), which comprises the aromatic compound having a carboxyl group and/or a salt thereof in an amount of 0.1 to 10 wt % based on the entire amount of the ink composition.

(13) The ink composition as described in any one of (1) to (12), wherein the content ratio of the cyan dye and the aromatic compound having a carboxyl group and/or a salt thereof is from 1:0.1 to 1:10 in terms of the weight ratio.

(14) The ink composition as described in any one of (1) to (13), which further comprises a nonionic surfactant.

(15) The ink composition as described in (14), wherein the nonionic surfactant is an acetylene glycol-based surfactant.

(16) The ink composition as described in (14) or (15), which comprises the nonionic surfactant in an amount of 0.1 to 5 wt % based on the entire amount of the ink composition.

(17) The ink composition as described in any one of (1) to (16), which further comprises a penetration accelerator.

(18) The ink composition as described in (17), wherein the penetration accelerator is a glycol ether.

(19) The ink composition as described in any one of (1) to (18), wherein the pH of the ink composition at 20° C. is from 8.0 to 10.5.

(20) The ink composition as described in any one of (1) to (19), which is used in an inkjet recording method.

(21) The ink composition as described in (20), wherein the inkjet recording method is a recording method using an inkjet head which forms an ink droplet by mechanical deformation of an electrostrictive element.

(22) An inkjet recording method comprising ejecting a liquid droplet of an ink composition, and attaching the liquid droplet onto a recording medium, thereby performing the recording, wherein the ink composition used is the ink composition described in any one of (1) to (21).

(23) Recorded matter which is recorded by using the ink composition described in any one of (1) to (21) or recorded by the recording method described in (22).

EFFECTS OF THE INVENTION

In the ink composition of the present invention, a metal phthalocyanine-based dye represented by formula (1) is used as the coloring agent and an aromatic compound having a carboxyl group and/or a salt thereof is contained, whereby there is provided an excellent effect that the recorded matter obtained by using this ink composition is excellent in the fastness (mainly gas fastness and light fastness) of printed matter and assured of an image free from a bronzing phenomenon.

BEST MODE FOR CARRYING OUT THE INVENTION

Figure 1:
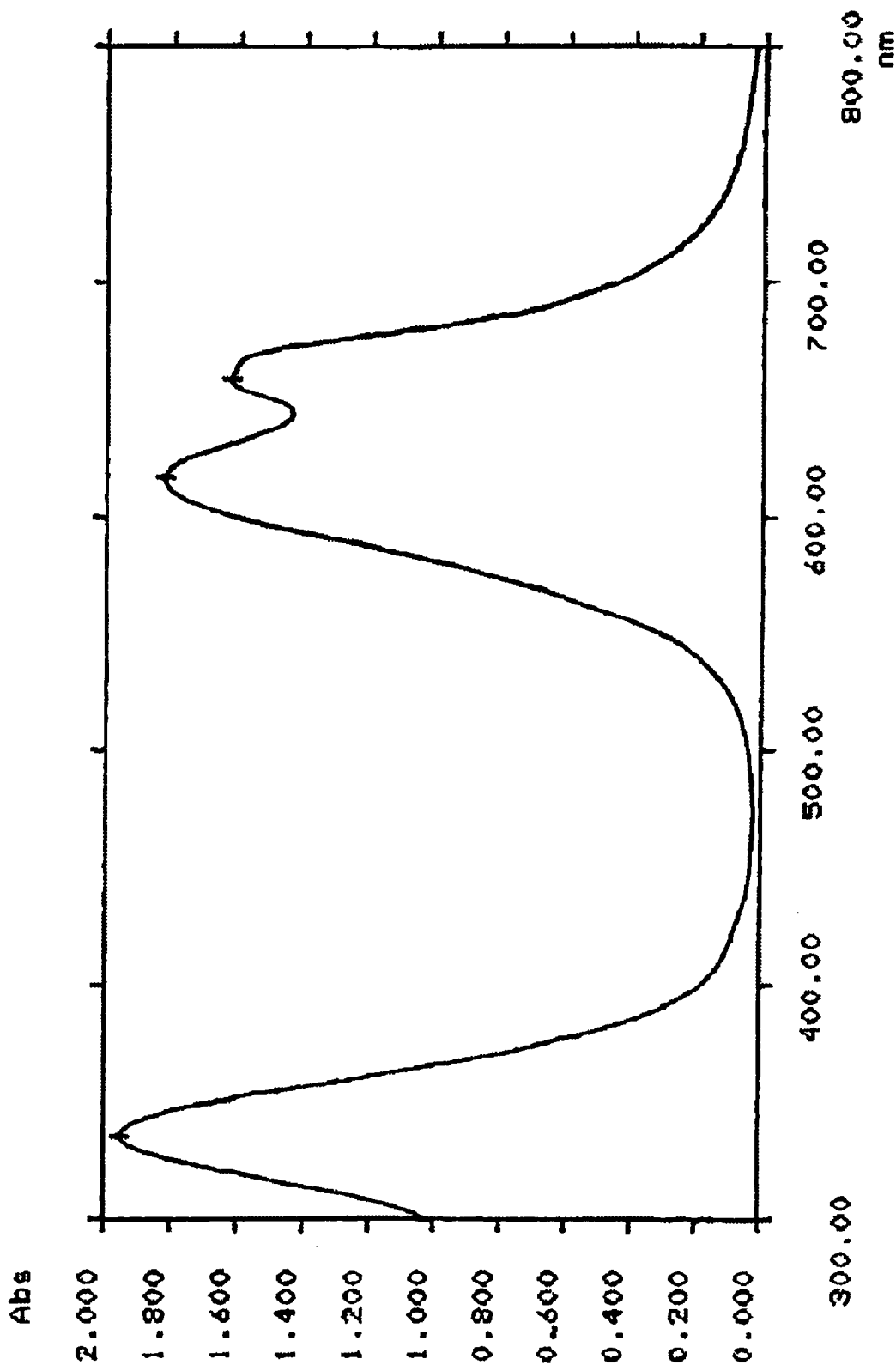
[FIG. 1] A view showing a spectral characteristic (absorption wavelength) of the dye (C.I. Direct Blue 199) used in Examples and Comparative Examples.

The ink composition of the present invention comprises at least a cyan dye represented by the following formula (I) and an aromatic compound having a carboxyl group and/or a salt thereof in an aqueous medium comprising water or comprising water and a water-soluble organic solvent, and may further comprises, as needed, a humectant, a viscosity adjusting agent, a pH adjusting agent and other additives.

The phthalocyanine compound represented by formula (I) for use in the ink composition of the present invention is described in detail below.

Formula (I):

[Chem. 5]

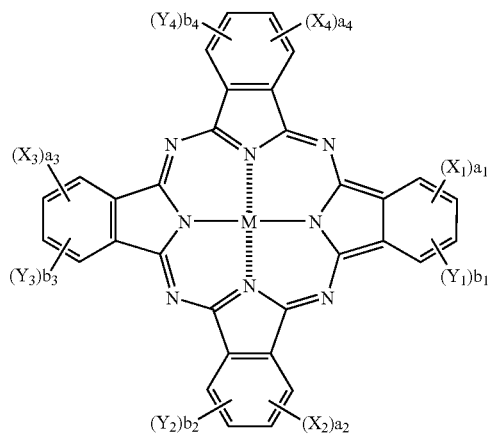

In formula (I), $X_1$, $X_2$, $X_3$ and $X_4$ each independently represents either —SO—Z or —SO$_2$—Z, preferably —SO$_2$—Z.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, still more preferably a substituted alkyl group or a substituted aryl group, and most preferably a substituted alkyl group.

The substituted or unsubstituted alkyl group represented by Z is preferably an alkyl group having from 1 to 30 carbon atoms. Examples of the substituent are the same as those of the substituent described later in the case where Z, $Y_1$, $Y_2$, $Y_3$ and $Y_4$ may further have a substituent.

The substituted or unsubstituted cycloalkyl group represented by Z is preferably a cycloalkyl group having from 5 to 30 carbon atoms. Examples of the substituent are the same as those of the substituent described later in the case where Z, $Y_1$, $Y_2$, $Y_3$ and $Y_4$ may further have a substituent.

The substituted or unsubstituted alkenyl group represented by Z is preferably an alkenyl group having from 2 to 30 carbon atoms. Examples of the substituent are the same as those of the substituent described later in the case where Z, $Y_1$, $Y_2$, $Y_3$ and $Y_4$ may further have a substituent.

The substituted or unsubstituted aralkyl group represented by Z is preferably an aralkyl group having from 7 to 30 carbon atoms. Examples of the substituent are the same as those of the substituent described later in the case where Z, $Y_1$, $Y_2$, $Y_3$ and $Y_4$ may further have a substituent.

The substituted or unsubstituted aryl group represented by Z is preferably an aryl group having from 6 to 30 carbon atoms. Examples of the substituent are the same as those of the substituent described later in the case where Z, $Y_1$, $Y_2$, $Y_3$ and $Y_4$ may further have a substituent.

The heterocyclic group represented by Z is preferably a 5- or 6-membered heterocyclic group, and the ring may be further condensed with another ring and may be an aromatic heterocyclic ring or a non-aromatic heterocyclic ring. The heterocyclic group represented by Z is exemplified below in the form of a heterocyclic ring by omitting the substitution position. The substitution position is not limited and, for example, pyridine may have a substituent at its 2-position, 3-position and 4-position. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof, when described in the same manner as above, include pyridine, pyrazine, pyrimidine, pyridazine, triazine, pyrazole, imidazole, benzimidazole, triazole, thiazole, benzothiazole, isothiazole, benzisothiazole and thiadiazole.

These heterocyclic groups each may have a substituent, and examples of the substituent are the same as those of the substituent described later in the case where Z, $Y_1$, $Y_2$, $Y_3$ and $Y_4$ each may further have a substituent.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group, and each group may further have a substituent.

Among these, preferred are a hydrogen atom, a halogen atom, an alkyl group, an aryl group, a cyano group, an alkoxy group, an amido group, a ureido group, a sulfonamido group, a carbamoyl group, an alkoxycarbonyl group, a carboxyl group and a sulfo group, more preferred are a hydrogen atom, a halogen atom, a cyano group, a carboxyl group and a sulfo group, and most preferred is a hydrogen atom.

In the case where $Y_1$, $Y_2$, $Y_3$, $Y_4$ and Z each is a group which may further have a substituent, each may further have the following substituent.

Examples of the substituent include a halogen atom (e.g., chlorine, bromine); a linear or branched alkyl group having a carbon number of 1 to 12, an aralkyl group having a carbon number of 7 to 18, an alkenyl group having a carbon number of 2 to 12, a linear or branched alkynyl group having a carbon number of 2 to 12, a cycloalkyl group having a carbon number of 3 to 12 which may have a side chain, a cycloalkenyl group having a carbon number of 3 to 12 which may have a side chain (specific examples of these groups include methyl, ethyl, propyl, isopropyl, tert-butyl, 2-methylsulfonylethyl, 3-phenoxypropyl, trifluoromethyl and cyclopentyl); an aryl group (e.g., phenyl, 4-tert-butylphenyl, 2,4-di-tert-amylphenyl); a heterocyclic group (e.g., imidazolyl, pyrazolyl, triazolyl, 2-furyl, 2-thienyl, 2-pyrimidinyl, 2-benzothiazolyl); an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenoxy); an acylamino group (e.g., acetamido, benzamido, 4-(3-tert-butyl-4-hydroxy-phenoxy)butanamido); an alkylamino group (e.g., methylamino, butylamino, diethylamino, methylbutylamino); an anilino group (e.g., phenylamino, 2-chloroanilino); a ureido group (e.g., phenylureido, methylureido, N,N-dibutylureido); a sulfamoylamino group (e.g., N,N-dipropylsulfamoylamino); an alkylthio group (e.g., methylthio, octylthio, 2-phenoxyethylthio); an arylthio group (e.g., phenylthio, 2-butoxy-5-tert-octylphenylthio, 2-carboxyphenylthio group); an alkyloxycarbonylamino group (e.g., methoxycarbonylamino); a sulfonamido group (e.g., methanesulfonamido, benzenesulfonamido, p-toluenesulfonamido); a carbamoyl group (e.g., N-ethylcarbamoyl, N,N-dibutylcarbamoyl); a sulfamoyl group (e.g., N-ethylsulfamoyl, N,N-dipropylsulfamoyl, N,N-diethylsulfamoyl); a sulfonyl group (e.g., methylsulfonyl, octylsulfonyl, phenylsulfonyl, 4-methyl-phenylsulfonyl); an alkyloxycarbonyl group (e.g., methoxycarbonyl, butyloxycarbonyl); a heterocyclic oxy group (e.g., 1-phenyltetrazol-5-oxy, 2-tetrahydropyranyloxy); an azo group (e.g., phenylazo group, 4-methoxyphenylazo group, 4-pivaloylaminophenylazo, 2-hydroxy-4-propanoylphenylazo); an acyloxy group (e.g., acetoxy); a carbamoyloxy group (e.g., N-methylcarbamoyloxy, N-phenylcarbamoyloxy); a silyloxy group (e.g., trimethylsilyloxy, dibutylmethylsilyloxy); an aryloxycarbonylamino group (e.g., phenoxycarbonylamino); an imido group (e.g., N-succinimido, N-phthalimido); a heterocyclic thio group (e.g., 2-benzothiazolylthio, 2,4-di-phenoxy-1,3,5-triazole-6-thio, 2-pyridylthio); a sulfinyl group (e.g., 3-phenoxypropylsulfinyl); a phosphonyl group (e.g., phenoxyphosphonyl, octyloxyphosphonyl, phenylphosphonyl); an aryloxycarbonyl group (e.g., phenoxycarbonyl); an acyl group (e.g., acetyl, 3-phenylpropanoyl, benzoyl); an ionic hydrophilic group (e.g., carboxyl, sulfo, quaternary ammonium, sulfonylsulfamoyl, acylsulfamoyl); a cyano group, a hydroxy group and an amino group. Among these substituents, preferred are a hydroxy group, an alkoxy group, a sulfamoyl group, a sulfonamido group, an acylamino group, a carbamoyl group, a cyano group and an ionic hydrophilic group, more preferred are a sulfamoyl group and an ionic hydrophilic group.

In formula (I), $a_1$ to $a_4$ and $b_1$ to $b_4$ each represents the number of substituents $X_1$ to $X_4$ and $Y_1$ to $Y_4$, $a_1$ to $a_4$ each independently represents an integer of 0 to 4, and $b_1$ to $b_4$ each independently represents an integer of 0 to 4, provided that when $a_1$ to $a_4$ and $b_1$ to $b_4$ each is an integer of 2 or more, the plurality of $X_1$'s, $X_2$'s, $X_3$'s, $X_4$'s, $Y_1$'s, $Y_2$'s, $Y_3$'s or $Y_4$'s may be the same or different.

$a_1$ and $b_1$ satisfy the relationship of $a_1+b_1=4$ and each independently represents an integer of 0 to 4. A combination where $a_1$ represents 1 or 2 and $b_1$ represents 3 or 2 is preferred, and a combination where $a_1$ represents 1 and $b_1$ represents 3 is most preferred.

$a_2$ and $b_2$ satisfy the relationship of $a_2+b_2=4$ and each independently represents an integer of 0 to 4. A combination where $a_2$ represents 1 or 2 and $b_2$ represents 3 or 2 is preferred, and a combination where $a_2$ represents 1 and $b_2$ represents 3 is most preferred.

$a_3$ and $b_3$ satisfy the relationship of $a_3+b_3=4$ and each independently represents an integer of 0 to 4. A combination where $a_3$ represents 1 or 2 and $b_3$ represents 3 or 2 is preferred, and a combination where $a_3$ represents 1 and $b_3$ represents 3 is most preferred.

$a_4$ and $b_4$ satisfy the relationship of $a_4+b_4=4$ and each independently represents an integer of 0 to 4. A combination where $a_4$ represents 1 or 2 and $b_4$ represents 3 or 2 is preferred, and a combination where $a_4$ represents 1 and $b_4$ represents 3 is most preferred.

M represents a hydrogen atom, a metal element, a metal oxide, a metal hydroxide or a metal halide.

M is, other than a hydrogen atom, preferably a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

In the phthalocyanine compound represented by formula (I), Pc (phthalocyanine ring) may form a diameter (e.g., Pc-M-L-M-Pc) or a trimer through L (a divalent linking group), and at this time, the plurality of M's may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining these groups.

In formula (I), the molecular weight of the phthalocyanine compound is preferably from 750 to 3,000, more preferably from 995 to 2,500, still more preferably from 995 to 2,000, and most preferably from 995 to 1,800.

In the case where Pc (phthalocyanine ring) of the phthalocyanine compound represented by formula (I) forms a diameter (e.g., Pc-M-L-M-Pc) or a trimer through L (a divalent linking group), the preferred molecular weight, for example, the most preferred molecular weight, is 2 times (in the case of dimer) or 3 times (in the case of trimer) the most preferred molecular weight described above (from 995 to 1,800). Here, the preferred molecular weight of the dimer or trimer is a value including the linking group L.

In the phthalocyanine compound represented by formula (I), at least one of $X_1, X_2, X_3, X_4, Y_1, Y_2, Y_3$ and $Y_4$ is an ionic hydrophilic group or a group having an ionic hydrophilic group as a substituent.

Examples of the ionic hydrophilic group as a substituent include a sulfo group (—$SO_3^-X^+$), a carboxyl group (—$CO_2^-X^+$), a quaternary ammonium group (—$N^+RR'R''X^-$), an acylsulfamoyl group (—$SO_2N^+X^-COR$), a sulfonylcarbamoyl group (—$CON^+X^-SO_2R$) and a sulfonylsulfamoyl group (—$SO_2N^+X^-SO_2R$). Among these, preferred are a sulfo group, a carboxyl group and a quaternary ammonium group, more preferred is a sulfo group. The sulfo group, the carboxyl group, the acylsulfamoyl group, the sulfonylcarbamoyl group and the sulfonylsulfamoyl group each may be in the state of a salt, and examples of the counter ion forming the salt include an alkali metal ion (e.g., sodium ion, potassium ion, lithium ion), an ammonium ion, an organic cation (e.g., tetramethylguanidinium ion) and an organic and/or inorganic anion (e.g., halogen ion, methanesulfonate ion, benzenesulfonate ion). Incidentally, X in the parenthesis above represents a hydrogen atom or a counter ion, and R, R' and R" each represents a substituent.

The phthalocyanine compound represented by formula (I) has good solubility or dispersibility in an aqueous solvent, because at least one ionic hydrophilic group or at least one group having an ionic hydrophilic group as a substituent is present within one molecule. From this standpoint, the phthalocyanine compound represented by formula (I) is preferably a compound having at least two ionic hydrophilic groups within one molecule, more preferably a compound where out of a plurality of ionic hydrophilic groups, at least one ionic hydrophilic group is a sulfo group, and most preferably a compound having at least two sulfo groups within one molecule.

The compound particularly preferred as the phthalocyanine compound represented by formula (I) is a compound having a combination of the following (a) to (f):

(a) $X_1$ to $X_4$ each is independently preferably —$SO_2$—Z;

(b) each Z is independently a substituted or unsubstituted alkyl group, a substituted or unsubstituted aryl group, or a substituted or unsubstituted heterocyclic group, preferably a substituted alkyl group, a substituted aryl group or a substituted heterocyclic group, and most preferably a substituted alkyl group;

(c) $Y_1$ to $Y_4$ each is independently preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom;

(d) $a_1$ to $a_4$ each is independently preferably 1 or 2, more preferably 1, and $b_1$ to $b_4$ each is independently preferably 3 or 2, more preferably 3;

(e) M is preferably Cu, Ni, Zn or Al, and most preferably Cu; and (f) the molecular weight of the phthalocyanine compound is preferably from 750 to 3,000, more preferably from 995 to 2,500, still more preferably from 995 to 2,000, and most preferably from 995 to 1,800.

As for the preferred combination of substituents in the compound represented by formula (I), a compound where at least one substituent out of various substituents is a preferred group described above is preferred, a compound where a larger number of various substituents are a preferred group described above is more preferred, and a compound where all substituents are a preferred group described above is most preferred.

Among the phthalocyanine compounds represented by formula (I), a phthalocyanine compound having a structure represented by the following formula (III) is preferred. The phthalocyanine compound represented by formula (III) for use in the present invention is described in detail below.

Formula (III): [Chem. 6]

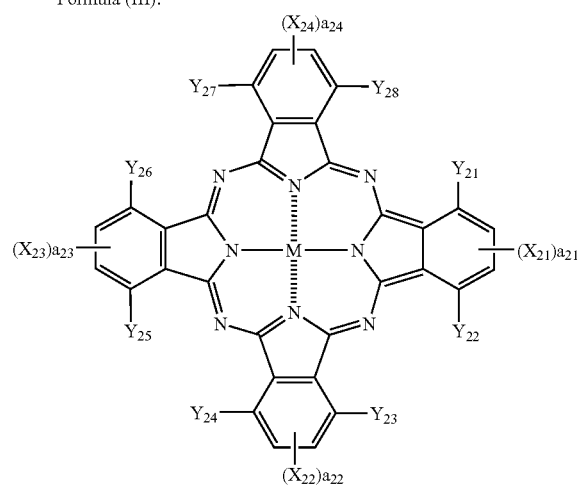

In formula (III), $X_{21}$, $X_{22}$, $X_{23}$ and $X_{24}$ each independently represents either —SO—Z or —$SO_2$—Z, preferably —$SO_2$—Z.

Z has the same meaning as Z in formula (I), and preferred examples are also the same.

$Y_{21}$ to $Y_{28}$ each independently has the same meaning as $Y_1$, $Y_2$, $Y_3$ and $Y_4$ in formula (I), and preferred examples are also the same.

$a_{21}$ to $a_{24}$ satisfy $4 \leq a_{21}+a_{22}+a_{23}+a_{24} \leq 8$, preferably $4 \leq a_{21}+a_{22}+a_{23}+a_{24} \leq 6$, and each independently represents an integer of 1 or 2. It is particularly preferred that $a_{21}=a_{22}=a_{23}=a_{24}=1$.

M has the same meaning as M in formula (I).

At least one of $X_{21}$, $X_{22}$, $X_{23}$, $X_{24}$, $Y_{21}$, $Y_{22}$, $Y_{23}$, $Y_{25}$, $Y_{26}$, $Y_{27}$ and $Y_{28}$ is an ionic hydrophilic group or a group having an ionic hydrophilic group as a substituent.

Examples of the ionic hydrophilic group are the same as those for $X_1$, $X_2$, $X_3$ and $X_4$ in formula (I), and preferred examples are also the same.

The phthalocyanine compound represented by formula (III) has good solubility or dispersibility in an aqueous solvent, because at least one ionic hydrophilic group or at least one group having an ionic hydrophilic group as a substituent is present within one molecule. From this standpoint, the phthalocyanine compound represented by formula (III) is preferably a compound having at least two ionic hydrophilic groups within one molecule, more preferably a compound where out of a plurality of ionic hydrophilic groups, at least one ionic hydrophilic group is a sulfo group, and most preferably a compound having at least two sulfo groups within one molecule.

In formula (III), the molecular weight of the phthalocyanine compound is preferably from 750 to 3,000, more preferably from 995 to 2,500, still more preferably from 995 to 2,000, and most preferably from 995 to 1,800.

In the case where Pc (phthalocyanine ring) of the phthalocyanine compound represented by formula (III) for use in the present invention forms a diameter (e.g., Pc-M-L-M-Pc) or a trimer through L (a divalent linking group), the preferred molecular weight, for example, the most preferred molecular weight, is 2 times (in the case of dimer) or 3 times (in the case of trimer) the most preferred molecular weight described above (from 995 to 1,800). Here, the preferred molecular weight of the dimer or trimer is a value including the linking group L.

The compound particularly preferred as the phthalocyanine compound represented by formula (III) is a compound having a combination of the following (a) to (f):

(a) $X_{21}$ to $X_{24}$ each is independently preferably —$SO_2$—Z;

(b) each Z is independently preferably a substituted or unsubstituted alkyl group, a substituted or unsubstituted aryl group, or a substituted or unsubstituted heterocyclic group, more preferably a substituted alkyl group, a substituted aryl group or a substituted heterocyclic group, and most preferably a substituted alkyl group;

(c) $Y_{21}$ to $Y_{28}$ each is independently preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom;

(d) $a_{11}$ to $a_{14}$ each is independently preferably 1 or 2 and more preferably, $a_{11}=a_{12}=a_{13}=a_{14}=1$;

(e) M is preferably Cu, Ni, Zn or Al, and most preferably Cu; and (f) the molecular weight of the phthalocyanine compound is preferably from 750 to 2,500, more preferably from 995 to 2,500, still more preferably from 995 to 2,000, and most preferably from 995 to 1,800.

As for the preferred combination of substituents in the compound represented by formula (III), a compound where at least one substituent out of various substituents is a preferred group described above is preferred, a compound where a larger number of various substituents are a preferred group described above is more preferred, and a compound where all substituents are a preferred group described above is most preferred.

Among the phthalocyanine compounds represented by formula (III), a phthalocyanine compound having a structure represented by the following formula (IV) is preferred. The phthalocyanine compound represented by formula (IV) for use in the present invention is described in detail below.

Formula (IV):

[Chem. 7]

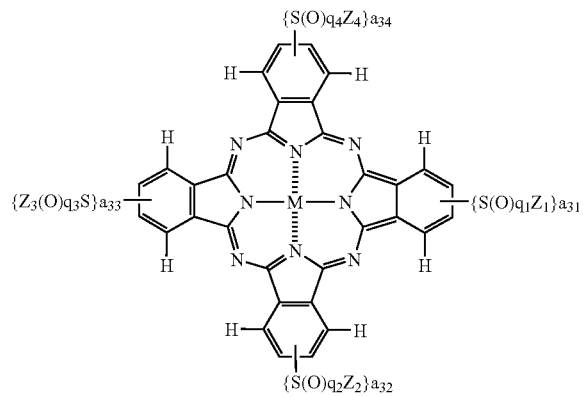

In formula (IV), $Z_1$, $Z_2$, $Z_3$ and $Z_4$ each independently has the same meaning as Z in formula (I), and preferred examples are also the same.

$q_1$, $q_2$, $q_3$ and $q_4$ each independently represents an integer of 1 or 2, preferably 2, and most preferably $q_1=q_2=q_3=q_4=2$.

$a_{31}$, $a_{32}$, $a_{33}$ and $a_{34}$ each independently represents an integer of 1 or 2, preferably 1, and it is most preferred that $a_{31}=a_{32}=a_{33}=a_{34}=1$.

M has the same meaning as M in formula (I).

At least one of $Z_1$, $Z_2$, $Z_3$ and $Z_4$ has an ionic hydrophilic group as a substituent.

Examples of the ionic hydrophilic group are the same as those for Z in formula (I), and preferred examples are also the same.

The molecular weight of the phthalocyanine compound is preferably from 750 to 2,500, more preferably from 995 to 2,500, still more preferably from 995 to 2,000, and most preferably from 995 to 1,800.

Among the phthalocyanine compounds represented by formula (I) for use in the present invention, a compound represented by the following formula (II) is more preferred.

Formula (II):

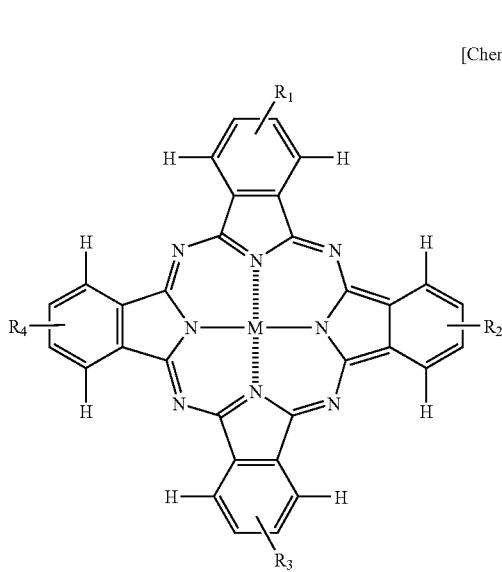

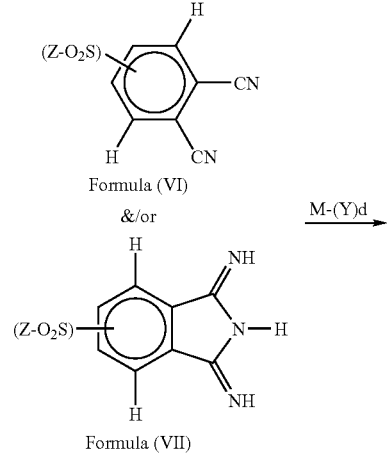

Formula (VI)

&/or

Formula (VII)

wherein M has the same meaning as in formula (I), $R_1$ to $R_4$ each independently represents —$SO_2Z$, and Z has the same meaning as in formula (I), with preferred examples thereof being also the same, provided that at least one of four Z's has an ionic hydrophilic group as a substituent.

Among these compounds, preferred is a compound where M in formula (II) is a copper element and Z an ionic hydrophilic group as a substituent is a sulfoalkyl group, and more preferred is a compound where the sulfo group is in the salt state and the counter cation forming the salt is a lithium cation.

The phthalocyanine compound represented by the following formula (V), which can be used in the present invention, is synthesized, for example, by reacting a metal derivative represented by M-(Y)d with a phthalonitrile compound represented by the following formula (VI) and/or a diiminoisoindoline derivative represented by the following formula (VII). In the formulae, Z and $Z_1$ to $Z_4$ each has the same meaning as Z in formula (I), and M has the same meaning as M in formula (I). Y represents a monovalent or divalent ligand such as halogen atom, acetate anion, acetylacetonate and oxygen, and d is an integer of 1 to 4. Examples of the metal derivative represented by M-(Y)d include a halide, a carboxylic acid derivative, a sulfate, a nitrate, a carbonyl compound, an oxide and a complex of Al, Si, Ti, V, Mn, Fe, Co, Ni, Cu, Zn, Ge, Ru, Rh, Pd, In, Sn, Pt and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride and tin chloride.

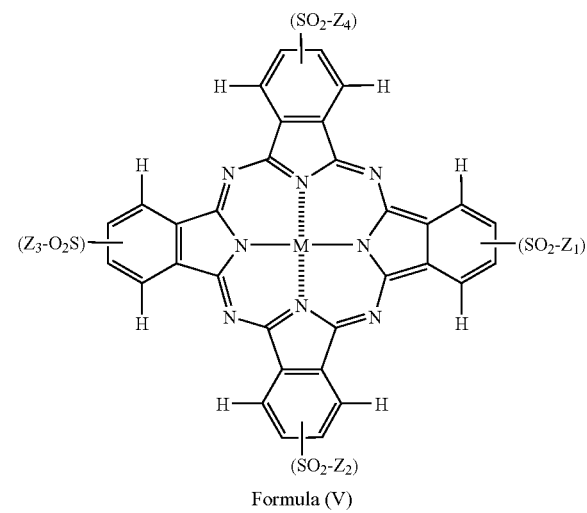

Formula (V)

The thus-obtained compound represented by formula (V) is usually a mixture of compounds represented by the following formulae (a)-1 to (a)-4, which are isomers with respect to the substitution positions of $R_1(SO_2—Z_1)$, $R_2(SO_2—Z_2)$, $R_3(SO_2—Z_3)$ and $R_4(SO_2—Z_4)$.

Furthermore, in the case of preparing a dye by using two or more different kinds of compounds represented by formula (VI) and/or formula (VII), which are differing in the substituent, the compound represented by formula (V) is a mixture of dyes differing in the kind and position of substituent.

Formula (a)-1:

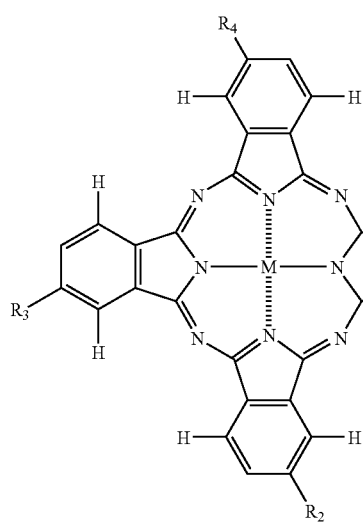

[Chem. 10]

Formula (a)-2:

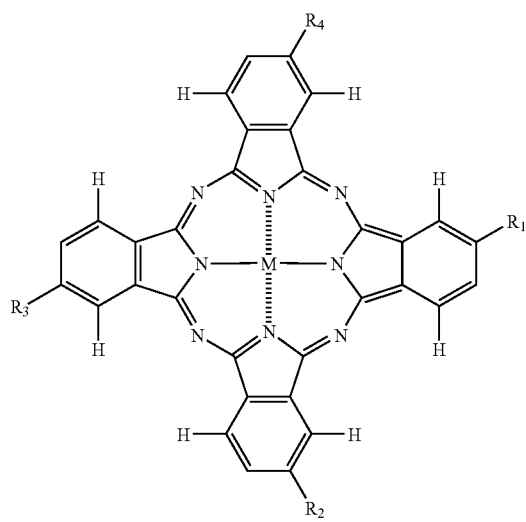

Formula (a)-3:

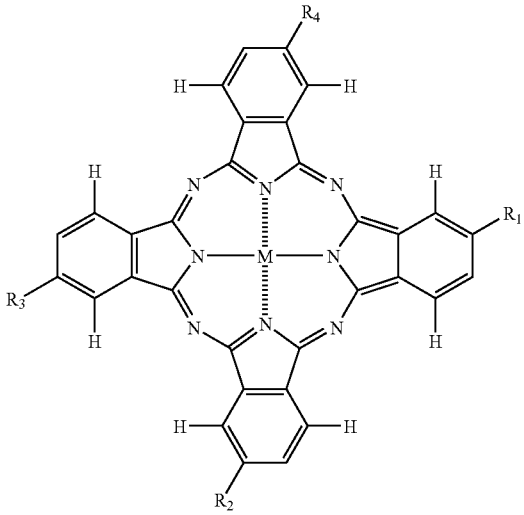

Formula (a)-4:

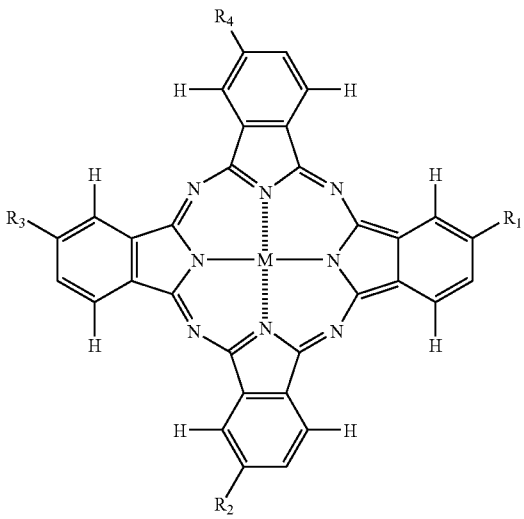

Examples of the cyan dye for use in the present invention include compounds having corresponding structures described in JP 2002-249677 A, JP 2003-213167 A, JP 2003-213168 A and Japanese Patent Application No. 2003-13792. Particularly preferred compounds are shown in Tables below. The compounds shown in Tables 1 and 2 can be synthesized by the method described in these publications or in the specification. Of course, the starting compound, the dye intermediate and the synthesis method are not limited to those described therein.

TABLE 1

| | | In formula (V): | | | |
|---|---|---|---|---|---|
| | M | $Z_1$ | $Z_2$ | $Z_3$ | $Z_4$ |
| Compound A | Cu | $-(CH_2)_3SO_3Na$ | $-(CH_2)_3SO_3Na$ | $-(CH_2)_3SO_3Na$ | $-(CH_2)_3SO_3Na$ |
| Compound B | Cu | $-(CH_2)_3SO_3Li$ | $-(CH_2)_3SO_3Li$ | $-(CH_2)_3SO_3Li$ | $-(CH_2)_3SO_3Li$ |
| Compound C | Cu | $-(CH_2)_3CO_2K$ | $-(CH_2)_3CO_2K$ | $-(CH_2)_3CO_2K$ | $-(CH_2)_3CO_2K$ |

TABLE 1-continued

In formula (V):

| | M | $Z_1$ | $Z_2$ | $Z_3$ | $Z_4$ |
|---|---|---|---|---|---|
| Compound D | Cu | —CH$_2$CH(OH)CH$_2$SO$_3$Li | —CH$_2$CH(OH)CH$_2$SO$_3$Li | —CH$_2$CH(OH)CH$_2$SO$_3$Li | —CH$_2$CH(OH)CH$_2$SO$_3$Li |
| Compound E | Cu | —(CH$_2$)$_2$CH(CH$_3$)SO$_3$Li | —(CH$_2$)$_2$CH(CH$_3$)SO$_3$Li | —(CH$_2$)$_2$CH(CH$_3$)SO$_3$Li | —(CH$_2$)$_2$CH(CH$_3$)SO$_3$Li |

TABLE 2

$$\text{In } M\text{-Pc}\begin{matrix}(SO_2R_1)n\\ \\(SO_2R_2)m\end{matrix} =$$

[Structure of metal phthalocyanine with SO$_2$R substituents at four positions]

| | M | $R_1$ | n | $R_2$ | m |
|---|---|---|---|---|---|
| Compound F | Cu | —(CH$_2$)$_3$SO$_3$Li | 3 | —(CH$_2$)$_3$SO$_2$NHCH$_2$CH(OH)CH$_3$ | 1 |
| Compound G | Cu | —(CH$_2$)$_3$SO$_3$Li | 2 | —(CH$_2$)$_3$SO$_2$NHCH$_2$CH(OH)CH$_3$ | 2 |
| Compound H | Cu | —(CH$_2$)$_3$SO$_3$Li | 3 | —(CH$_2$)$_3$SO$_2$NHCH(CH$_3$)CH$_2$OH | 1 |
| Compound I | Cu | —(CH$_2$)$_3$SO$_3$Li | 2 | —(CH$_2$)$_3$SO$_2$NHCH(CH$_3$)CH$_2$OH | 2 |
| Compound J | Cu | —(CH$_2$)$_3$SO$_3$Li | 3 | —(CH$_2$)$_3$SO$_2$N(C$_2$H$_4$OH)$_2$ | 1 |
| Compound K | Cu | —(CH$_2$)$_3$SO$_3$Li | 3 | —(CH$_2$)$_5$CO$_2$Li | 1 |

In the Table, the introduction of substituents: (SO$_2$R$_1$) and (SO$_2$R$_2$) is in random order (isomers represented by formulae (a)-1 to (a)-4 are shown), and m and n values are a charged molar ratio of phthalonitrile derivative used for the synthesis of phthalocyanine derivative.

In general, when solid printing is performed on an inkjet special recording medium (particularly, gloss-type recording medium) or the like by using an ink composition containing a cyan dye, a bronzing phenomenon sometimes occurs. Out of the cyan dyes, a cyan dye having higher fastness both to light and gas tends to cause a stronger bronzing phenomenon at the time of performing solid printing on an inkjet special recording medium (particularly, gloss-type recording medium) or the like by using an ink composition containing the dye.

In order to obtain inkjet recorded matter excellent in both light fastness and gas fastness, free of a bronzing phenomenon, assured of high image quality and furthermore capable of preventing discoloration in an oxidative gas atmosphere, for example, in the presence of ozone, nitrogen oxide or sulfur oxide present in air, this can be attained by incorporating an aromatic compound having a carboxyl group, which is described later, into the cyan dye.

The content of the dye is determined according to the kind of compound represented by formula (I), the kind of solvent component or the like but is preferably from 0.1 to 10 wt %, more preferably from 0.5 to 5 wt %, based on the entire weight of the ink composition. When the dye content is 0.1 wt % or more, color formability and image density on a recording medium can be ensured, and when it is 10 wt % or less, the adjustment of viscosity of the ink composition is facilitated and the properties such as ejection reliability and clogging resistance can be easily assured.

The ink composition of the present invention comprises at least one aromatic compound having a carboxyl group or a salt thereof so as to weaken or eliminate a bronzing phenomenon as encountered in performing solid printing by using the above-described ink composition containing a cyan dye.

In the present invention, as long as the ink composition comprises water, a cyan dye represented by formula (I) and at least one aromatic compound having a carboxyl group or a salt thereof, the bronzing phenomenon as encountered in the solid printing can be weakened or eliminated even if it is an ink composition for a color different from cyan, such as black ink composition, needless to say about a cyan ink composition. For producing these various ink compositions, the cyan dye can be used in combination with other conventionally known dyes.

The aromatic compound having a carboxyl group or a salt thereof for use in the present invention may be any compound as long as it is an aromatic compound having at least one carboxyl group within the molecular structure or a salt thereof, but an aromatic compound having one carboxyl group or an aromatic compound having a naphthalene skeleton is preferred. Also, an aromatic compound having a carboxyl group and an —OR group (R is a hydrogen atom or an alkyl group having a carbon number of 1 to 6) on the naphthalene skeleton is preferred, and the compound having a naphthalene skeleton or a salt thereof preferably contains one carboxyl group and one —OR group. Furthermore, a compound having a carboxyl group at its 2-position and having a naphthalene skeleton or a salt thereof is more preferred, and an alkali metal salt of a compound having a carboxyl group at its 2-position and having a naphthalene skeleton is more preferred. Among the alkali metal salts of a compound having a carboxyl group at its 2-position and having a naphthalene skeleton, a lithium salt is preferred not only in aspects of improvement of anti-bronzing property but also in-aspects of clogging resistance.

Specific examples of the aromatic compound having a carboxyl group or a salt thereof include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, 4-hydroxybenzoic acid, 2,6-naphthalenedicarboxylic acid, and a salt (particularly, lithium salt) thereof.

The salt of the aromatic compound having a carboxyl group may be added in the form of a salt and incorporated into ink or the aromatic compound having a carboxyl group and a base may be added separately and incorporated into ink.

The content of the aromatic compound having a carboxyl group and/or a salt thereof is preferably from 0.1 to 10 wt %, more preferably from 0.5 to 5 wt %, based on the entire weight of the ink composition, though this content is determined according to the kind of the aromatic compound having a carboxyl group and/or a salt thereof, the kind of the dye, the kind of the solvent component or the like.

In the ink composition of the present invention, the content ratio of the cyan dye and the aromatic compound having a carboxyl group and/or a salt thereof is preferably from 1:0.1 to 1:10, more preferably from 1:0.3 to 1:6. When the ratio of the aromatic compound having a carboxyl group and/or a salt thereof is 1:0.1 or more, a sufficiently high effect of improving the bronzing phenomenon can be obtained, and when the ratio of the aromatic compound having a carboxyl group and/or a salt thereof is 1:10 or less, clogging reliability and the like can be easily ensured.

In order to stably dissolve a predetermined amount of the dye and a predetermined amount of the aromatic compound having a carboxyl group and/or a salt thereof, the pH (20° C.) of the ink composition is preferably 8.0 or more. Also, considering the material resistance against various members with which the ink composition comes into contact, the pH of the ink composition is preferably 10.5 or less. In order to successfully attain both the stable dissolution and the material resistance, the pH of the ink composition is more preferably adjusted to from 8.5 to 10.0.

The ink composition of the present invention may further contain a humectant selected from a water-soluble organic solvent having a vapor pressure smaller than that of pure water and/or saccharides.

By virtue of containing a humectant, the evaporation of water can be suppressed and the ink can retain moisture in the inkjet recording system. Also, when the humectant is a water-soluble organic solvent, the ejection stability may be improved or the viscosity may be easily varied without causing any change in the ink properties.

The water-soluble organic solvent means a medium having a function of dissolving a solute and is selected from water-soluble organic solvents having a vapor pressure smaller than that of water. Specific preferred examples thereof include polyhydric alcohols such as ethylene glycol, propylene glycol, butanediol, pentanediol, 2-butene-1,4-diol, 2-methyl-2, 4-pentanediol, glycerin, 1,2,6-hexanetriol, diethylene glycol, triethylene glycol and dipropylene glycol; ketones such as acetonylacetone; esters such as γ-butyrolactone and triethyl phosphate; a furfuryl alcohol, a tetrahydrofurfuryl alcohol and a thiodiglycol.

Preferred examples of the saccharides include maltitol, sorbitol, gluconolactone and maltose.

The humectant is preferably added in an amount of 5 to 50 wt %, more preferably from 5 to 30 wt %, still more preferably from 5 to 20 wt %, based on the entire amount of the ink composition. When the amount added thereof is 5 wt % or more, moisture retentivity can be obtained, and when it is 50 wt % or less, the viscosity can be easily adjusted to a viscosity for use in the inkjet recording.

The ink composition of the present invention preferably comprises a nitrogen-containing organic solvent as the solvent. Examples of the nitrogen-containing organic solvent include 1,3-dimethyl-2-imidazolidinone, 2-pyrrolidone, N-methyl-2-pyrrolidone and ε-caprolactam. Among these, 2-pyrrolidone is preferred. One of these nitrogen-containing organic solvents may be used alone, or two or more thereof may be used in combination.

The content of the nitrogen-containing organic solvent is preferably from 0.5 to 10 wt %, more preferably from 1 to 5 wt %. When the content of this solvent is 0.5 wt % or more, the solubility of the coloring material for use in the present invention can be improved by the addition, and when it is 10 wt % or less, the material resistance against various members with which the ink composition comes into contact is not worsened.

The ink composition of the present invention preferably contains a nonionic surfactant as an additive effective for obtaining swift fixing (penetrability) of the ink and maintaining the circularity of one dot.

Examples of the nonionic surfactant for use in the present invention include an acetylene glycol-based surfactant. Specific examples of the acetylene glycol-based surfactant include Surfynol 465, Surfynol 104 (trade names, both are produced by Air Products and Chemicals, Inc.), Olfine STG and Olfine PD001 (trade names, both are produced by Nisshin Chemical Industry Co.). The amount of the nonionic surfactant added is preferably from 0.1 to 5 wt %, more preferably from 0.5 to 2 wt %. When the amount added thereof is 0.1 wt % or more, sufficiently high penetrability can be obtained, and when it is 5 wt % or less, generation of image blurring can be easily prevented.

In addition to the nonionic surfactant, by adding glycol ethers as the penetration accelerator, penetrability is more enhanced and on performing color printing, bleeding at the boundary between adjacent color inks is reduced and a very sharp image can be obtained.

Examples of the glycol ethers which can be used in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether and triethylene glycol monobutyl ether. The amount of the glycol ether added is from 3 to 30 wt %, preferably from 5 to 15 wt %. If the amount added thereof is less than 3 wt %, the effect of preventing bleeding cannot be obtained, whereas if it exceeds 30 wt %, not only image blurring is generated but also oily separation occurs and a dissolution aid such as glycol ethers is required, as a result, the viscosity of the ink is increased and the ink can be hardly ejected by the inkjet head.

Furthermore, a pH adjusting agent such as triethanolamine and a hydroxide of alkali metal, a hydrotropy agent such as urea and a derivative thereof, a water-soluble polymer such as sodium alginate, a water-soluble resin, a fluorine-containing surfactant, an antifungal agent, a rust inhibitor and the like may be added to the ink composition of the present invention, if desired.

The ink composition of the present invention may be prepared, for example, by a method of thoroughly mixing and dissolving respective components, filtering the resulting solution under pressure through a membrane filter having a pore diameter of 0.8 μm, and then performing a deaeration treatment with the use of a vacuum pump.

The recording method of the present invention using the above-mentioned ink composition is described below. In the recording method of the present invention, an inkjet recording system of ejecting the ink composition in the form of liquid droplets from fine orifices, and attaching the liquid droplets onto a recording medium, thereby performing the recording, can be suitably used, but the recording method is of course usable also for applications such as general writing tool, recorder and pen plotter.

As for the inkjet recording system, any conventionally known system can be employed. Particularly, excellent image recording can be performed by a method where liquid droplets are ejected by using vibration of a piezoelectric element (a recording method using an inkjet head which forms an ink droplet by mechanical deformation of an electrostrictive element), or by a method using heat energy.

EXAMPLES

The present invention is described in greater detail below by referring to Examples and Comparative Examples.

However, the present invention should not be construed as being limited to the following Examples.

Examples 1 to 17 and Comparative Examples 1 to 5

Ink compositions of Examples 1 to 17 and Comparative Examples 1 to 5 each was prepared by mixing and dissolving respective components at a blending ratio shown in Table 3 and filtering the resulting solution under pressure through a membrane filter having a pore diameter of 1 μm.

TABLE 3

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Coloring material | Compound A shown in Table 1 | 3 | 1 | 1 | | | | | | | | |
| | Compound B shown in Table 1 | | | | 3 | 5 | | | | | | |
| | Compound C shown in Table 1 | | | | | | 5 | 5 | | | | |
| | Compound D shown in Table 1 | | | | | | | | 1 | | | |
| | Compound E shown in Table 1 | | | | | | | | | 1 | | |
| | Compound F shown in Table 2 | | | | | | | | | | 5 | |
| | Compound G shown in Table 2 | | | | | | | | | | | 5 |
| | Compound H shown in Table 2 | | | | | | | | | | | |
| | Compound I shown in Table 2 | | | | | | | | | | | |
| | Compound J shown in Table 2 | | | | | | | | | | | |
| | Compound K shown in Table 2 | | | | | | | | | | | |
| | C.I. Direct Blue 86 | | | | | | | | | | | |
| | C.I. Direct Blue 199(*1) | | | | | | | | | | | |
| Organic solvent, etc. | Glycerin | 10 | 10 | 10 | 10 | 10 | | | 10 | 5 | 10 | 10 |
| | Triethylene glycol | 7 | 7 | 7 | 7 | 5 | 17 | 17 | 5 | 10 | 5 | 5 |
| | 2-Pyrrolidone | 2 | 2 | 2 | 2 | 2 | 2 | 2 | 2 | | 2 | 2 |
| | Olfine E1010 (produced by Nisshin Chemical Industry Co.) | 0.5 | 0.5 | 0.5 | 0.5 | | 1 | 1 | | 0.5 | | |
| | Olfine PD001 (produced by Nisshin Chemical Industry Co.) | | | | | 0.5 | | | 0.5 | | 0.5 | 0.5 |
| | Diethylene glycol monobutyl ether | | | | | | | | | 10 | | |
| | Triethylene glycol monobutyl ether | 10 | 10 | 10 | 10 | 10 | 9 | 9 | 10 | | 10 | 10 |
| | LiOH monohydrate | | | | | 0.5 | 0.3 | 0.3 | 0.1 | | 0.5 | 0.5 |
| | NaOH | 0.7 | 0.03 | 2 | 0.7 | | | | | 1 | | |
| | Triethanolamine | 0.1 | 0.2 | 0.2 | 0.1 | 0.2 | 0.1 | 0.1 | 0.2 | 0.3 | 0.2 | 0.2 |
| Anti-bronzing additive | 2-Naphthoic acid | | | | | 2 | | | | | 2 | 2 |
| | Benzoic acid | | | | | | | | | | | |
| | 3-Hydroxy-2-naphthoic acid | | | | | | | | | 5 | | |
| | 6-Hydroxy-2-naphthoic acid | 3 | 0.1 | 10 | 3 | | | | | | | |
| | 4-Hydroxybenzoic acid | | | | | | | | | | | |
| | 6-Methoxy-2-naphthoic acid | | | | | | 1.5 | | 0.5 | | | |
| | 2-Methoxy-1-naphthoic acid | | | | | | | 1.5 | | | | |
| | L-Proline | | | | | | | | | | | |
| Antiseptic | Proxel XL-2 (produced by AVECIA) | 0.3 | 0.3 | 03 | 0.3 | 0.3 | 0.3 | 0.3 | 0.3 | 0.3 | 0.3 | 0.3 |
| | Water | bal. | bal. | bal. | bal. | bal. | bal. | bal. | bal. | bal. | bal. | bal. |

TABLE 3-continued

|  |  | Example | | | | | | Comparative Example | | | | |
|---|---|---|---|---|---|---|---|---|---|---|---|---|
|  |  | 12 | 13 | 14 | 15 | 16 | 17 | 1 | 2 | 3 | 4 | 5 |
| Coloring material | Compound A shown in Table 1 |  |  |  |  |  |  |  |  |  |  |  |
|  | Compound B shown in Table 1 |  |  |  |  |  |  |  |  |  | 3 |  |
|  | Compound C shown in Table 1 |  |  |  |  |  |  |  |  |  |  | 5 |
|  | Compound D shown in Table 1 |  |  |  |  |  |  |  |  |  |  |  |
|  | Compound E shown in Table 1 |  |  |  |  |  |  |  |  |  |  |  |
|  | Compound F shown in Table 2 |  |  |  |  |  |  |  |  |  |  |  |
|  | Compound G shown in Table 2 |  |  |  |  |  |  |  |  |  |  |  |
|  | Compound H shown in Table 2 | 2 | 2 |  |  |  |  |  |  |  |  |  |
|  | Compound I shown in Table 2 |  |  | 0.1 | 5 |  |  |  |  |  |  |  |
|  | Compound J shown in Table 2 |  |  |  |  | 0.5 |  |  |  |  |  |  |
|  | Compound K shown in Table 2 |  |  |  |  |  | 10 |  |  |  |  |  |
|  | C.I. Direct Blue 86 |  |  |  |  |  |  | 5 |  |  |  |  |
|  | C.I. Direct Blue 199(*1) |  |  |  |  |  |  |  | 5 | 5 |  |  |
| Organic solvent, etc. | Glycerin | 10 | 10 | 10 | 10 | 10 | 2 | 10 | 10 | 10 | 10 |  |
|  | Triethylene glycol | 5 | 5 | 15 | 5 | 5 | 10 | 5 | 5 | 5 | 7 | 17 |
|  | 2-Pyrrolidone | 2 | 2 | 2 | 2 | 2 | 2 | 2 | 2 | 2 | 2 | 2 |
|  | Olfine E1010 (produced by Nisshin Chemical Industry Co.) |  |  |  |  | 0.5 |  |  |  |  | 0.5 | 1 |
|  | Olfine PD001 (produced by Nisshin Chemical Industry Co.) | 0.5 | 0.5 | 0.5 | 0.5 |  | 0.5 | 0.5 | 0.5 | 0.5 |  |  |
|  | Diethylene glycol monobutyl ether | 9 | 9 |  |  | 10 |  |  |  |  |  |  |
|  | Triethylene glycol monobutyl ether |  |  | 10 | 10 |  | 10 | 10 | 10 | 10 | 10 | 9 |
|  | LiOH monohydrate | 0.3 |  | 0.2 |  | 0.3 | 1 | 0.1 | 0.1 | 0.3 |  | 0.1 |
|  | NaOH |  | 0.3 |  |  |  |  |  |  |  | 0.2 |  |
|  | Triethanolamine |  |  |  | 0.1 | 0.2 | 0.1 | 0.2 | 0.2 | 0.2 | 0.1 | 0.1 |
| Anti-bronzing additive | 2-Naphthoic acid |  |  |  |  | 2 | 1 |  |  |  |  |  |
|  | Benzoic acid |  |  |  |  |  |  | 3 |  |  |  |  |
|  | 3-Hydroxy-2-naphthoic acid |  |  |  |  |  |  |  |  |  |  |  |
|  | 6-Hydroxy-2-naphthoic acid | 1 | 1 |  |  |  |  |  |  | 1 |  |  |
|  | 4-Hydroxybenzoic acid |  |  | 0.6 |  |  |  |  |  |  |  |  |
|  | 6-Methoxy-2-naphthoic acid |  |  |  |  |  |  |  |  |  |  |  |
|  | 2-Methoxy-1-naphthoic acid |  |  |  |  |  |  |  |  |  |  |  |
|  | L-Proline |  |  |  |  |  |  |  |  |  | 3 |  |
| Antiseptic | Proxel XL-2 (produced by AVECIA) | 0.3 | 0.3 | 0.3 | 0.3 | 0.3 | 0.3 | 0.3 | 0.3 | 0.3 | 0.3 | 0.3 |
|  | Water | bal. | bal. | bal. | bal. | bal. | bal. | bal. | bal. | bal. | bal. | bal. |

Unit: wt %
(*1): A coloring material having spectral characteristic (absorption wavelength) shown in FIG. 1 was used.

In the Table, each component in the ink composition is shown by wt % of each component based on the entire amount of the ink composition, and the balance is water.

The ink compositions of Examples 1 to 17 and Comparative Examples 1 to 5 each was filled in a special cartridge (cyan chamber) for an inkjet printer EM930C (manufactured by Seiko Epson Corporation), and printing was performed by using the printer on an inkjet special recording medium (Premium Glossy Photo Paper and Glossy Film, both are produced by Seiko Epson Corporation). The printed matter was subjected to respective evaluations. The results obtained are shown in Table 4.

<Evaluation of Bronzing>

Solid printing was performed by using the cartridge above to give a hitting amount of 1.5 to 2.2 mg per 1 inch-square, and the resulting printed matter was measured (measuring angle: 60°) by using a gloss meter (PG-1M, manufactured by Nippon Denshoku Industries Co., Ltd.) to determine the glossiness. The printing was performed in an environment of 25° C. and 40% RH.

The value obtained from the glossiness according to the following formula was used as the bronzing criterion.

Glossiness (Printed Matter)—Glossiness (Recording Medium)

[Criteria]
A: less than 15
B: from 15 to less than 35
C: from 35 to less than 55
D: 55 or more <Evaluation of Ozone Fastness>

Using the cartridge above, printing was performed by adjusting the applied duty to give an OD (optical density) falling within the range from 0.9 to 1.1. The resulting printed matter was exposed for a predetermined time (6 hours, 12 hours) by using an ozone weather meter Model OMSH (trade name, manufactured by Suga Test Instruments Co., Ltd.) under the conditions of 24° C., a relative humidity of 60% RH and an ozone concentration of 20 ppm.

After the exposure, OD of each printed matter was measured by a densitometer ("Spectrolino", manufactured by Gretag), and the residual optical density (ROD) was determined according to the following formula and evaluated according to the criteria shown below:

$$ROD(\%) = (D/D_0) \times 100$$

D: OD after exposure test
$D_0$: OD before exposure test (provided that the measurement conditions were: filter: red, light source: D50 and viewing angle: 2°).

[Criteria]
A: ROD was 90% or more.
B: ROD was from 80% to less than 90%.
C: ROD was from 70% to less than 80%.
D: ROD was less than 70%.

<Evaluation of Clogging Resistance>

The cartridge above was loaded into an inkjet printer EM930C (manufactured by Seiko Epson Corporation) and after confirming that the ink composition was normally ejected at the initial stage, the power source of the main body was turned off. Subsequently, the printer was left standing in an environment of 40° C. and 20% RH while the ink cartridge was loaded therein. After standing for a predetermined time, EM930C was taken out and when the temperature dropped to ordinary temperature, the power source was turned on and whether the ink was normally ejected was examined. In the case where the ink was not normally ejected, a predetermined cleaning recovery operation for EM930C was effected and then, printing was performed. The number of cleaning recovery operations required until the ink could be normally ejected was determined and evaluated according to the following criteria.

[Criteria]

A: The ink was normally ejected after the power source was turned on or the cleaning operation was performed once.

B: The ink was normally ejected after the cleaning operation was performed 2 or 3 times.

C: The ink was normally ejected after the cleaning operation was performed from 4 to 6 times.

D: The ink was not normally ejected even after the cleaning operation was performed 6 times.

-continued

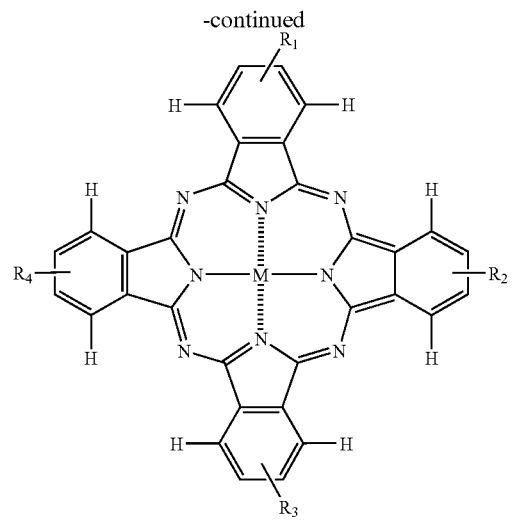

wherein $R_1$ to $R_4$ each independently represents $SO_2Z$ and each Z independently represents a substituted or unsubstituted alkyl group, a substituted or unsubstituted cycloalkyl group, a substituted or unsubstituted alkenyl group, a substi-

TABLE 4

|  |  | Bronzing | Ozone Fastness | | | | Clogging Resistance | |
|---|---|---|---|---|---|---|---|---|
|  |  | Premium Glossy Photo Paper | Premium Glossy Photo Paper | | Glossy Film | | | |
|  |  | Paper | 6 hours | 12 hours | 6 hours | 12 hours | 30 days | 180 days |
| Example | 1 | B | A | B | B | C | B | C |
|  | 2 | A | B | C | B | C | B | B |
|  | 3 | A | B | C | B | C | B | C |
|  | 4 | A | A | B | B | C | B | B |
|  | 5 | A | A | B | A | C | A | B |
|  | 6 | A | A | B | A | C | A | A |
|  | 7 | C | A | B | A | C | A | A |
|  | 8 | A | B | C | B | C | A | B |
|  | 9 | A | B | C | B | C | A | B |
|  | 10 | A | A | B | A | B | A | B |
|  | 11 | B | A | A | A | B | B | B |
|  | 12 | A | A | B | A | C | A | B |
|  | 13 | B | A | B | A | C | B | B |
|  | 14 | A | A | B | A | C | A | A |
|  | 15 | C | A | A | A | B | B | C |
|  | 16 | A | A | B | A | C | A | A |
|  | 17 | C | A | B | A | C | B | C |
| Comparative Example | 1 | A | D | D | D | D | B | B |
|  | 2 | D | C | D | D | D | A | B |
|  | 3 | B | C | D | D | D | A | B |
|  | 4 | D | A | B | B | C | B | B |
|  | 5 | D | A | B | A | C | A | A |

The invention claimed is:

1. An ink composition comprising at least water, a cyan dye represented by formula (II) shown below, and an aromatic compound having a carboxyl group and/or a salt thereof:

Formula (II):

tuted or unsubstituted aralkyl group, a substituted or unsubstituted aryl group or a substituted or unsubstituted heterocyclic group, provided that at least one of the Z's has an ionic hydrophilic group as a substituent; and M represents a hydrogen atom, a metal element or an oxide, hydroxide or halide thereof.

2. The ink composition as claimed in claim 1, wherein said cyan dye is a cyan dye of formula (II) where M is a copper element and Z having an ionic hydrophilic group is a sulfoalkyl group.

3. The ink composition as claimed in claim 2, wherein the counter cation of said sulfoalkyl group is a lithium cation.

4. The ink composition as claimed in claim 1, wherein said aromatic compound having a carboxyl group and/or a salt thereof is an aromatic compound having one carboxyl group and/or a salt thereof.

5. The ink composition as claimed in claim 1, wherein said aromatic compound having a carboxyl group and/or a salt thereof is a compound having a naphthalene skeleton and/or a salt thereof.

6. The ink composition as claimed in claim 5, wherein said compound having a naphthalene skeleton and/or a salt thereof is a compound having a carboxyl group and an —OR group, wherein R is a hydrogen atom or an alkyl group having a carbon number of 1 to 6, on the naphthalene skeleton.

7. The ink composition as claimed in claim 6, wherein said compound having a naphthalene skeleton and/or a salt thereof is a compound having one carboxyl group and one —OR group, wherein R is a hydrogen atom or an alkyl group having a carbon number of 1 to 6, on the naphthalene skeleton.

8. The ink composition as claimed in claim 5, wherein said compound having a naphthalene skeleton and/or a salt thereof is a compound having a carboxyl group at its 2-position and/or a salt thereof.

9. The ink composition as claimed in claim 8, wherein said compound having a carboxyl group at its 2-position and having a naphthalene skeleton and/or a salt thereof is at least one member selected from the group consisting of a 1-hydroxy-2-naphthoic acid, a 2-naphthoic acid, a 3-hydroxy-2-naphthoic acid, a 6-hydroxy-2-naphthoic acid, a 3-methoxy-2-naphthoic acid, a 6-methoxy-2-naphthoic acid, a 6-ethoxy-2-naphthoic acid, a 6-propoxy-2-naphthoic acid, and a salt thereof.

10. The ink composition as claimed in claim 1, wherein said salt is a lithium salt.

11. The ink composition as claimed in claim 1, which comprises said aromatic compound having a carboxyl group and/or a salt thereof in an amount of 0.1 to 10 wt % based on the entire amount of the ink composition.

12. The ink composition as claimed in claim 1, wherein the content ratio of said cyan dye and said aromatic compound having a carboxyl group and/or a salt thereof is from 1:0.1 to 1:10 in terms of the weight ratio.

13. The ink composition as claimed in claim 1, which further comprises a nonionic surfactant.

14. The ink composition as claimed in claim 13, wherein said nonionic surfactant is an acetylene glycol-based surfactant.

15. The ink composition as claimed in claim 13, which comprises said nonionic surfactant in an amount of 0.1 to 5 wt % based on the entire amount of the ink composition.

16. The ink composition as claimed in claim 1, which further comprises a penetration accelerator.

17. The ink composition as claimed in claim 16, wherein said penetration accelerator is a glycol ether.

18. The ink composition as claimed in claim 1, wherein the pH of the ink composition at 20° C. is from 8.0 to 10.5.

19. An inkjet recording method that utilizes the ink composition as claimed in claim 1.

20. The inkjet recording method as claimed in claim 19, wherein said inkjet recording method is a recording method that utilizes an inkjet head which forms an ink droplet by mechanical deformation of an electrostrictive element.

21. An inkjet recording method comprising ejecting a liquid droplet of an ink composition, and attaching said liquid droplet onto a recording medium, thereby performing the recording, wherein the ink composition is the ink composition in claim 1.

22. Recorded matter which is recorded with the ink composition claimed in claim 1.

23. Recorded matter recorded by the recording method claimed in claim 21.

* * * * *